(12) United States Patent
Smith, III

(10) Patent No.: US 6,516,831 B1
(45) Date of Patent: Feb. 11, 2003

(54) UNDERSEA HYDRAULIC COUPLING WITH RADIAL SEALS ON PROBE

(75) Inventor: Robert E. Smith, III, Missouri City, TX (US)

(73) Assignee: National Coupling Company, Inc., Stafford, TX (US)

(*) Notice: Subject to any disclaimer, the term of this patent is extended or adjusted under 35 U.S.C. 154(b) by 0 days.

(21) Appl. No.: 10/094,363

(22) Filed: Mar. 8, 2002

(51) Int. Cl.$^7$ ................................................ F16L 37/32
(52) U.S. Cl. .................. 137/614.04; 251/149.7; 285/108; 285/917
(58) Field of Search .................. 137/614.04, 614, 137/614.03, 614.05; 251/149.7, 149.6, 149.1; 285/108, 111, 917

(56) References Cited

U.S. PATENT DOCUMENTS

| | | | |
|---|---|---|---|
| 2,753,195 A | 7/1956 | Palmer | |
| 2,896,977 A | * 7/1959 | Hansen | 137/614.04 X |
| 4,582,347 A | 4/1986 | Wilcox et al. | |
| 4,589,495 A | 5/1986 | Langer et al. | |
| 4,597,413 A | 7/1986 | Buseth | |
| 4,709,727 A | 12/1987 | Gober | |
| 5,323,811 A | * 6/1994 | Hohmann et al. | 137/614.04 |
| 5,323,812 A | 6/1994 | Wayne | |
| 5,337,782 A | 8/1994 | Wilcox | |
| 5,343,891 A | 9/1994 | Bosley | |
| 5,343,892 A | * 9/1994 | Saito | 137/614.04 |
| 5,406,980 A | 4/1995 | Allread et al. | |
| 6,206,040 B1 | * 3/2001 | Smith, III | 137/614.04 |

* cited by examiner

Primary Examiner—Kevin Lee
(74) Attorney, Agent, or Firm—Trop, Pruner & Hu, P.C.

(57) ABSTRACT

An undersea hydraulic coupling is disclosed having a male member with at least two radial seals around the outer circumference of the probe. The seals on the probe engage the receiving chamber and seal retainer of the female coupling member. When the seals retained in the female coupling member are worn or damaged, the seals on the male coupling member provide the primary sealing mechanism in the coupling. The coupling includes a normally closed poppet valve within each of the male female coupling members.

13 Claims, 3 Drawing Sheets

UNDERSEA HYDRAULIC COUPLING WITH RADIAL SEALS ON PROBE

BACKGROUND OF THE INVENTION

1. Field of the Invention

The present invention relates to hydraulic couplings used in undersea drilling and production applications and seals used in those couplings. More particularly, the invention involves an undersea hydraulic coupling with radial seals on the probe of the male coupling member.

2. Description of Related Art

Subsea hydraulic couplings are old in the art. The couplings generally consist of a male member and a female member with soft seals positioned within the female member to seal the junction between the male and female members. The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion, or probe, at one end having a diameter approximately equal to the diameter of the large bore of the female portion of the coupling. The male member also includes a connection at its other end to facilitate connection to hydraulic lines. When the cylindrical portion of the male member is inserted into the large bore of the female member, according to the various embodiments of the device, the soft seals, or O-rings, either abut the end or face of the male member or engage the cylindrical probe wall about its outer circumference. The hydraulic fluid is then free to flow through the female and male members of the coupling, and seals prevent that flow from escaping about the joint and the coupling. Typically, the male and female members of undersea hydraulic couplings are attached to opposing manifold plates.

In some instances, a check or poppet valve may be installed in the female member and also in the male member. Each valve opens when the coupling is made up and closes when the coupling is broken so as to prevent fluid from leaking out of the system of which the coupling is a part.

The seals used in undersea hydraulic couplings should, if possible, be reusable. After the coupling members are separated, the coupling can be made up again and effectively seal hydraulic fluid in the internal passages of the coupling members, and effectively seal out sea water. The effectiveness of the seals is critical, particularly when the couplings are subject to high pressures at depths of several thousand feet or more.

U.S. Pat. Nos. 4,694,859 and 5,762,106 to Robert E. Smith, III, assigned to National Coupling Co., Inc. of Stafford, Tex., disclose undersea hydraulic couplings having pressure energized metal seals retained in the female coupling member for sealing between the male and female coupling members. A seal retainer holds the seal in the female coupling member. When the male and female members of the coupling are parted under pressure, the retainer does not blow out through the bore of the female member.

U.S. Pat. Nos. 4,900,071 and 5,052,439 to Robert E. Smith, III, assigned to National Coupling Co., Inc., disclose undersea hydraulic couplings with annular elastomeric seals retained in the female coupling member by a two-piece retainer. The seal is restrained from radial movement by an interfit with the retainer. When the coupling is parted under pressure, the seal does not blow out through the bore of the female member.

U.S. Pat. No. 5,232,021 to Robert E. Smith, III, assigned to National Coupling Co., Inc., discloses a probe for an undersea hydraulic coupling having at least one circumferential depression in its outer cylindrical body, for disengaging one or more radial seals during insertion or withdrawal of the probe from the receiving member of a coupling. Disengagement of the radial seals allows seawater to bleed from or into the space between the coupling members and thereby balance the coupling and seals to seawater pressure.

U.S. Pat. No. 5,983,934 to Robert E. Smith, III, assigned to National Coupling Co., Inc., discloses an undersea hydraulic coupling with a male member having a stepped outer body that may be inserted into a female member which has retained therein three seals and a three part seal retaining member. Two of the seals engage different diameters of the male member, prior to opening of the valves in the male and female members.

The metal and/or elastomeric seals positioned in the female member of undersea hydraulic couplings are designed to be reusable. After repeated engagement and disengagement of the coupling members, the seals may become worn or damaged. A leak path may form around or through a worn or damaged seal, allowing hydraulic fluid to leak out from the coupling and/or seawater to enter into the coupling. Replacement of seals can cause significant delay and expense. To replace the seals, the manifold plate with the female coupling members must be retrieved and brought to the surface, the seals replaced, and the manifold plate repositioned and the couplings reconnected subsea.

It is desirable to extend the life of the female coupling members before the seals are replaced. It also is desirable to keep the female coupling members subsea when they are disconnected from the male coupling members. This reduces the time and cost for retrieval. If the female coupling members stay subsea when they are disconnected, their seals and sealing surfaces are exposed to and may become damaged by silt and marine growth.

An improved undersea hydraulic coupling is needed that will eliminate or minimize the need to retrieve female coupling members and replace seals held therein. An improved undersea hydraulic coupling also is needed having a male member that fits and sealingly engages female coupling members that have worn seals. An improved undersea hydraulic coupling also is needed that will extend the life of female coupling members having worn or damaged seals.

SUMMARY OF THE INVENTION

The present invention resides in an undersea hydraulic coupling of the foregoing type including male and female members for fluid communication therebetween and valves for controlling fluid flow in each of the members. The present invention includes a male member having radial seals around the probe. The seals on the probe block a potential leak path, and provide the primary sealing mechanism between the male and female coupling members when the seals retained in the female coupling member are worn or damaged.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

Figure 1:
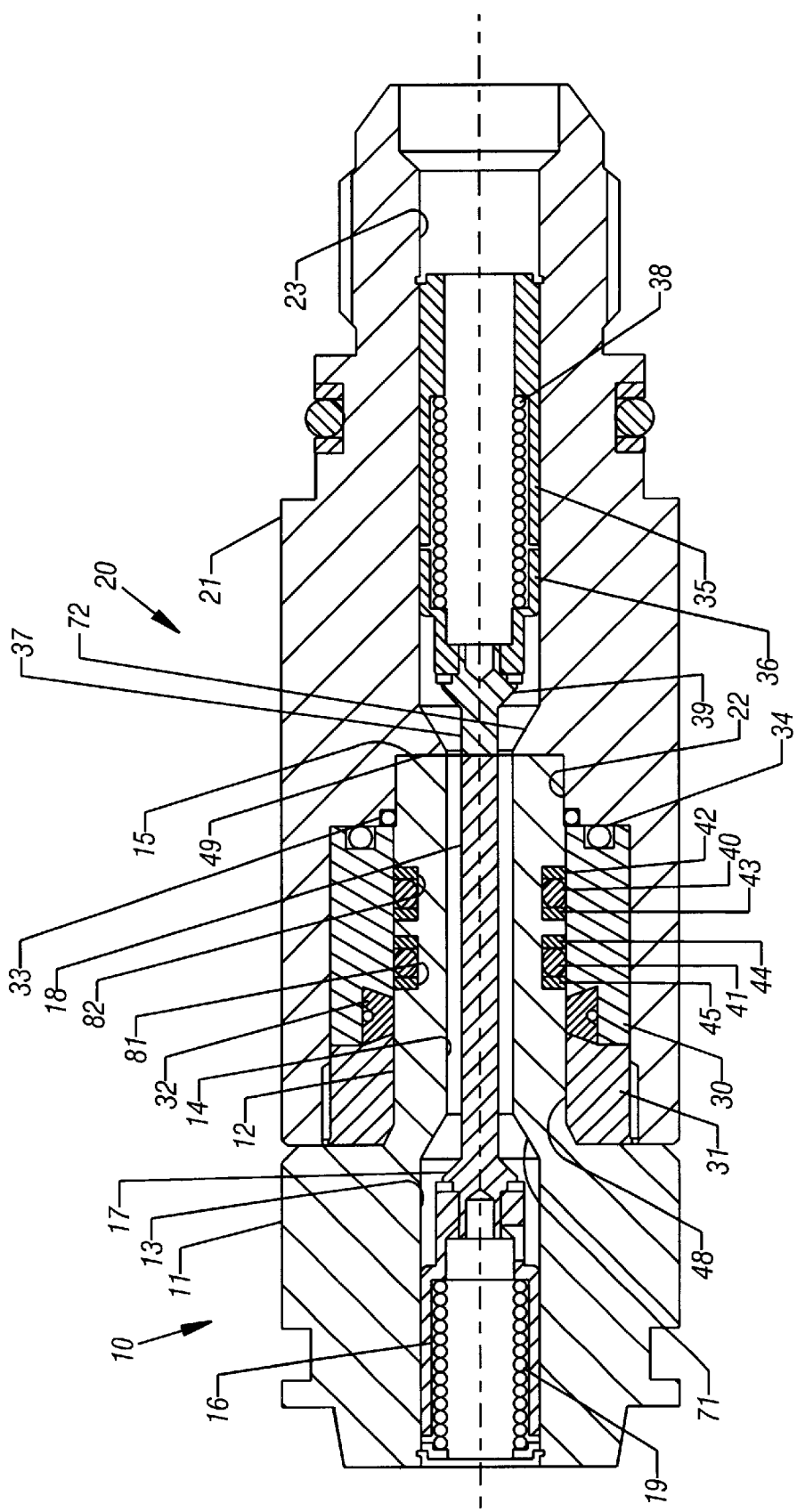
FIG. 1 is a sectional view of a first preferred embodiment of the present invention showing the male member fully inserted into the female member of the coupling.

FIG. 1 shows male member 10 and female member 20 in a first preferred embodiment of the present invention, with the male member fully inserted into the receiving chamber of the female member. The male member may be attached to a manifold plate with threads or other means such as set screws. The female member also may be attached to a second manifold plate by threads or other means. Techniques for attaching the members to such plates are well known to those skilled in the art.

The male member comprises body 11 and probe 12. Internal bore 13 extends from the first end of the body to conical valve seat 71. A poppet valve is positioned in internal bore 13 of the body section of the male member. The poppet valve includes cylindrical valve body 16 and conical valve face 17. Valve spring 19 urges the conical valve face toward the closed, sealed position against the conical valve seat.

Internal bore 14 extends through the probe from the valve seat to leading face 15. Internal bore 14 in the probe has a smaller diameter than internal bore 13 in the body of the male coupling member. Valve actuator 18 extends from the apex of the conical valve face through internal bore 14. With the reduced diameter of internal bore 14 through the the probe walls have sufficient thickness and strength to accommodate circumferential grooves 80, 81 and withstand high external and internal pressures without fatigue or strain. Annular, radial seals are positioned in the circumferential grooves around the outer circumference of the probe.

In a first preferred embodiment, shown in FIG. 1, two sets of seals are positioned in circumferential grooves 80, 81 around the probe. The first set of seals comprises elastomeric O-ring 40 and teflon backup rings 42, 43. The second set of seals comprises elastomeric O-ring 41 and teflon backup rings 44, 45. In this embodiment, the seals on the probe are located axially between the innermost seals in the receiving chamber (i.e., metal seal 33 and O-ring 34) and the outermost seals in the receiving chamber (i.e., elastomeric dovetail seal 32) when the probe is fully inserted therein. Thus, the seals on the probe engage and form a seal between the probe and receiving chamber or seal retainer positioned therein. These seals on the probe provide the primary seal between the coupling members if the seals held in the female member are worn or damaged.

The female coupling member includes body 21, internal bore 23 extending from a first end thereof to internal shoulder 49, and receiving chamber 22. A poppet valve assembly is positioned in internal bore 23 in the female coupling member, and includes cylindrical valve body 36, conical valve face 39, and valve actuator 37. Valve spring 38 urges the conical valve face toward the closed, sealed position against conical valve seat 72. Spring collar 35 holds the valve spring in the internal bore of the female member.

Seal retainer 30 holds annular seals 33, 34 in the female member. In the embodiment of FIG. 1, for example, seal retainer retains pressure energized metal seal 33 and elastomeric O-ring seal 34 in the receiving chamber. The seal retainer is preferably sleeve shaped to slide into the receiving chamber and is held in place by retainer locking member 31 which is threaded to the female member. Locking devices other than threads, such as snap rings, may be used to lock the seal retainer to the receiving chamber of the female member. Elastomeric seal 32 is retained between the seal retainer and retainer locking member, and preferably has a dovetail interfit to restrict the seal from implosion into the receiving chamber due to low pressure.

The probe of the male coupling member is dimensioned to be inserted though bore 48 in the retainer locking member and seal retainer, into receiving chamber 22 until leading face 15 abuts internal shoulder 49.

Figure 2:
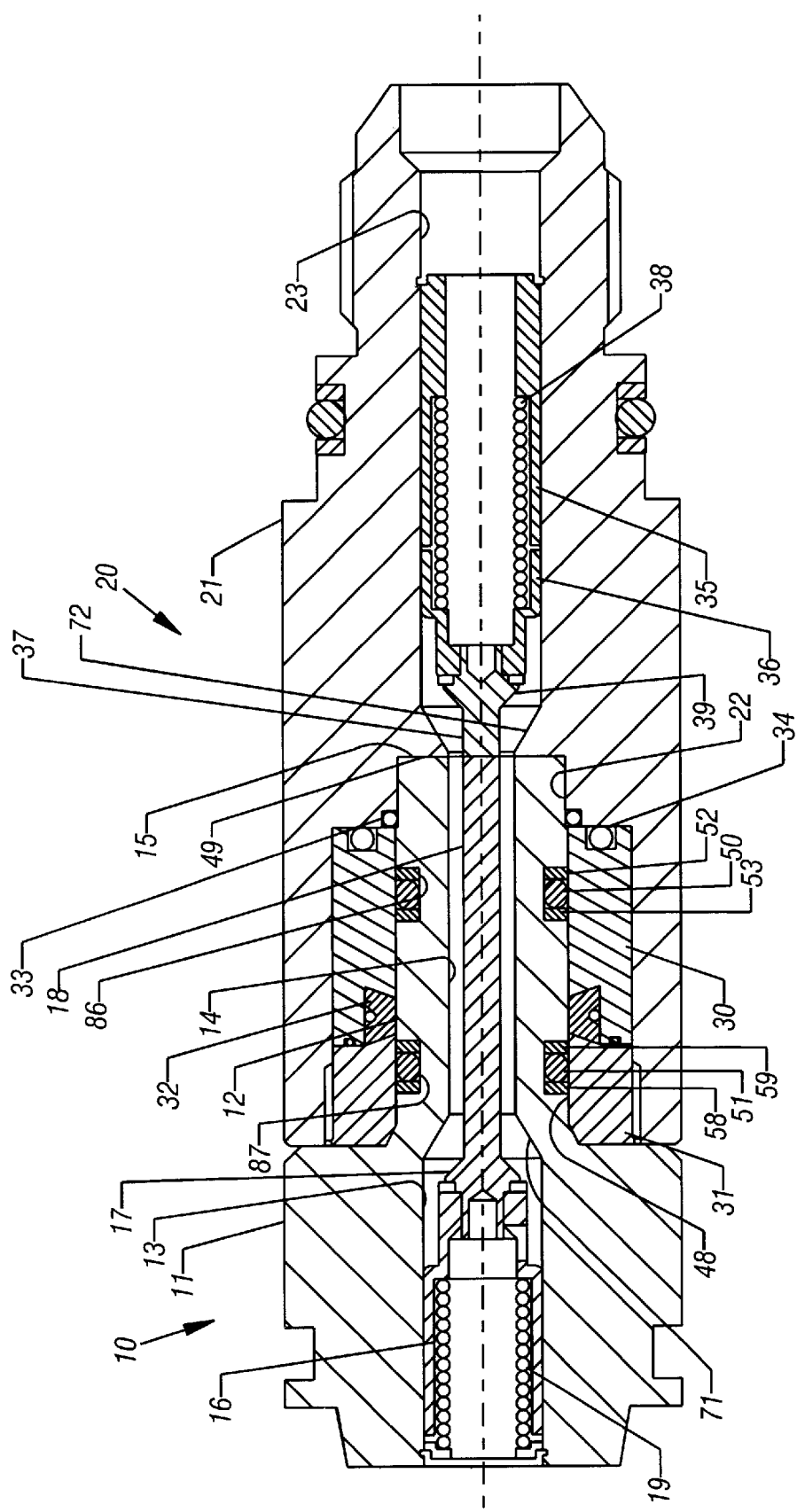
FIG. 2 is a sectional view of a second preferred embodiment of the present invention showing the male member fully inserted into the female member of the coupling.

In FIG. 2, a second preferred embodiment of the invention is shown. Two sets of annular, radial seals are positioned in circumferential grooves 86, 87. The first set of seals comprises elastomeric O-ring 50 and teflon backup rings 52, 53. The second set of seals comprises elastomeric O-ring 51 and teflon backup rings 58, 59. In this embodiment, one set of seals on the probe is located axially between the innermost seals in the receiving chamber (i.e., metal seal 33 and O-ring 34) and the outermost seals in the receiving chamber (i.e., elastomeric dovetail seal 32) when the probe is fully inserted therein. The second set of seals on the probe is located axially between the outermost seals in the receiving chamber (i.e., elastomeric dovetail seal 32) and the end of the female coupling member when the probe section is fully inserted therein. The seals on the probe engage and form a seal between the probe section and the receiving chamber, or with the seal retainer and retainer locking member, and serve as the primary seals in the coupling when the seals held in the female member are worn or damaged.

Figure 3:
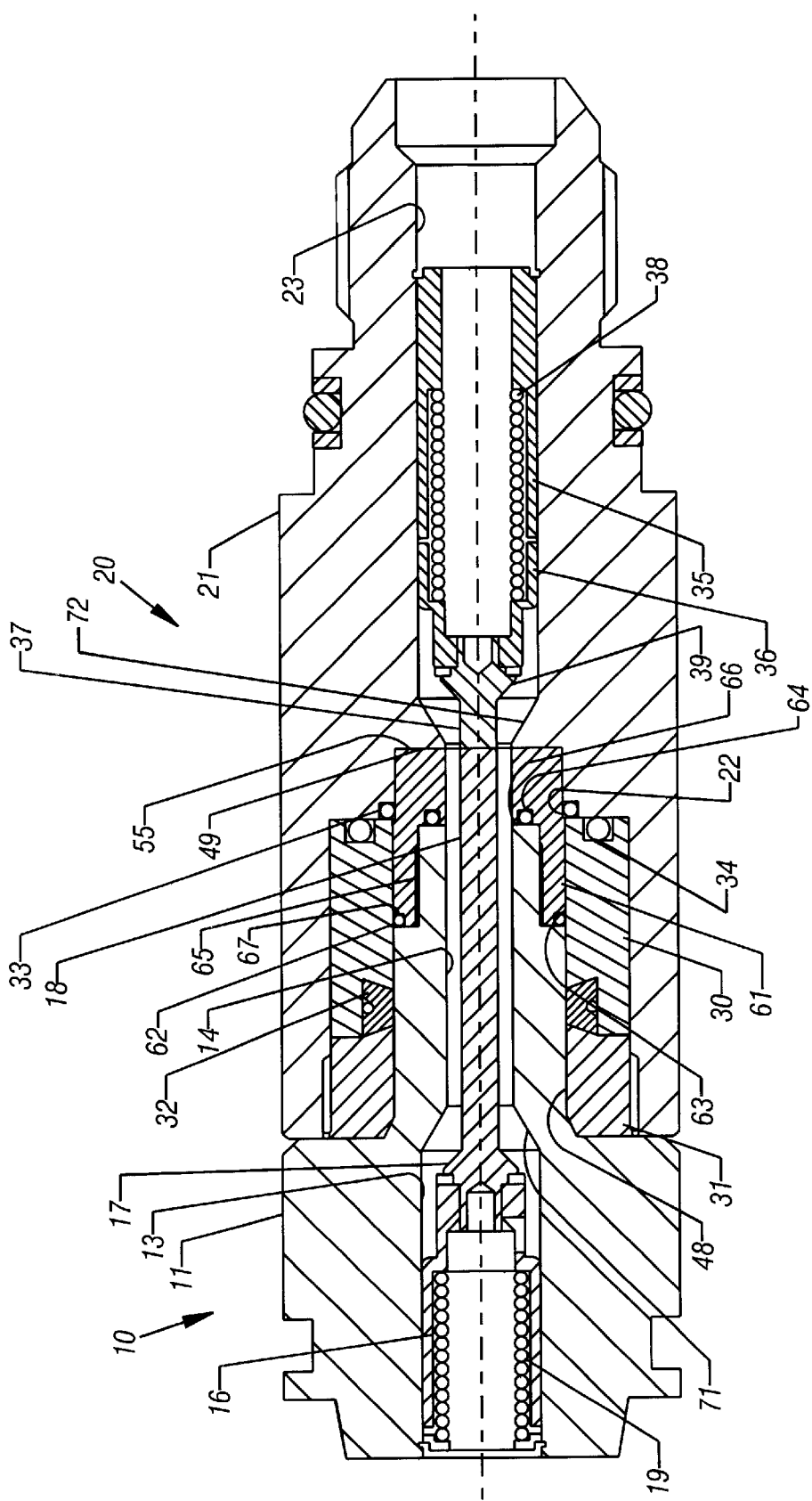
FIG. 3 is an sectional view of a third preferred embodiment of the present invention showing the male member fully inserted into the female member of the coupling.

FIG. 3 shows the invention according to a third preferred embodiment. In this embodiment, at least one of the seals retained on the probe is an annular, radial, pressure energized metal seal. Seal 63 is such a ring-shaped metal seal and is retained on shoulder 67 of the probe by probe retainer 61. Probe retainer is attached to threaded section 65 of the probe. When the probe retainer is threaded to the probe, it can slightly compress, or pre-load, seal 63 before the probe is inserted into the receiving chamber. Slightly compressing or pre-loading the seal forces the seal to extend radially outwardly slightly from the probe. This allows the seal to engage the receiving chamber or seal retainer of the female member before hydraulic fluid pressure-energizes the seal. Second annular seal 64 is positioned on the probe between the leading face 66 and the probe retainer. Seal 64 also may be a pressure energized metal seal, or it may be an elastomeric seal such as an O-ring. Thus, in the third embodiment, the pressure energized metal seal on the probe engages and seals with the receiving chamber or the seal retainer positioned therein.

It will now be understood by those of skill in the art that an improved undersea hydraulic coupling may be made utilizing the present invention. Although variations in the embodiment of the present invention may not each realize all the advantages of the invention, certain features may become more important than others in various applications of the device. This invention, accordingly, should be understood to be limited only by the scope of the appended claims.

What is claimed is:

1. An undersea hydraulic coupling comprising:
    (a) a female coupling having a body with an internal bore extending therethrough, a normally closed poppet valve positioned in the bore for controlling the flow of hydraulic fluid therethrough, and receiving chamber having at least one annular seal retained therein; and (b) a male coupling member having a body and a probe insertable into the receiving chamber, a first internal bore through the body and a second internal bore through the probe, the second internal bore having a smaller diameter than the first internal bore, a normally closed poppet valve in the first internal bore and a poppet valve actuator extending through the second internal bore, a plurality of grooves around the outer circumference of the probe, and a radial seal positioned in each groove.

2. The undersea hydraulic coupling of claim 1 wherein at least one of the radial seals is an elastomeric seal.

3. The undersea hydraulic coupling of claim 1 wherein at least one of the radial seals is a pressure energized metal seal.

4. The undersea hydraulic coupling of claim 1 further comprising a seal retainer for holding the annular seal in the female coupling member.

5. An undersea hydraulic coupling comprising:

(a) a female member having an internal bore, a receiving chamber, at least one radial seal positioned in the receiving chamber, and a seal retainer for holding each radial seal in the receiving chamber; and (b) a male member having a body with an internal bore having a first diameter, a probe having an internal bore with a second diameter smaller than the first diameter, the probe dimensioned to fit in the receiving chamber, the probe having an outer circumference, and two radial seals positioned around the outer circumference for sealingly engaging the seal retainer when the probe is inserted into the receiving chamber.

6. The undersea hydraulic coupling of claim 5 wherein at least one of the radial seals positioned around the outer circumference of the probe is a pressure-energized metal seal.

7. The undersea hydraulic coupling of claim 5 further comprising a first poppet valve in the internal bore of the female member, and a second poppet valve in the internal bore of the male member body.

8. The undersea hydraulic coupling of claim 7 further comprising poppet valve actuators extending from the first and second poppet valves, the poppet valve actuator extending from the second poppet valve through the internal bore in the probe.

9. The undersea hydraulic coupling of claim 5 wherein the receiving chamber of the female member has a first innermost seal and a second outermost seal, and the two radial seals around the circumference of the probe are located axially between the innermost seal and outermost seal when the male member is completely inserted into the female receiving chamber.

10. An undersea hydraulic coupling comprising:

(a) a female member having a stepped internal bore with first and second internal shoulders, a first innermost annular seal positioned on the first internal shoulder, a two-piece seal retainer dimensioned to hold the first innermost annular seal on the first internal shoulder, a second outermost annular seal held between the two-piece seal retainer, and a poppet valve for controlling flow of hydraulic fluid through the bore;

(b) a male member having a probe insertable through the two-piece seal retainer into the stepped internal bore of the female member, the male member having a stepped internal bore; and (c) at least two radial seals around the probe section, the radial seals located axially between the first innermost annular seal and second outermost annular seal when the probe abuts the second internal shoulder.

11. The undersea hydraulic coupling of claim 10 further comprising a normally closed poppet valve in the stepped internal bore of the male member, the poppet valve having an actuator extending through the probe.

12. The undersea hydraulic coupling of claim 10 wherein each radial seal comprises an elastomeric O-ring and at least one Teflon back-up ring.

13. The undersea hydraulic coupling of claim 10 wherein at least one of said radial seals is a pressure energized metal seal.

* * * * *